(12) United States Patent
De Laforcade et al.

(10) Patent No.: US 8,316,863 B2
(45) Date of Patent: Nov. 27, 2012

(54) APPLICATOR NOZZLE AND APPLICATOR ASSEMBLY INCORPORATING SUCH A NOZZLE

(75) Inventors: Vincent De Laforcade, Rambouillet (FR); Philippe Bonneyrat, Clichy (FR)

(73) Assignee: L'Oreal S.A., Paris (FR)

( * ) Notice: Subject to any disclaimer, the term of this patent is extended or adjusted under 35 U.S.C. 154(b) by 653 days.

(21) Appl. No.: 10/619,612

(22) Filed: Jul. 16, 2003

(65) Prior Publication Data

US 2004/0016440 A1 Jan. 29, 2004

Related U.S. Application Data

(60) Provisional application No. 60/398,565, filed on Jul. 26, 2002, provisional application No. 60/398,570, filed on Jul. 26, 2002.

(30) Foreign Application Priority Data

Jul. 17, 2002 (FR) ..................................... 02 09034
Jul. 17, 2002 (FR) ..................................... 02 09035

(51) Int. Cl.
*A45D 24/22* (2006.01)
(52) U.S. Cl. ........................ 132/113; 132/112; 132/116
(58) Field of Classification Search .................. 132/125, 132/126, 111–116; D28/7, 20, 25, 30; 401/175, 401/185; 15/397
See application file for complete search history.

(56) References Cited

U.S. PATENT DOCUMENTS

| | | | |
|---|---|---|---|
| 514,290 A | 2/1894 | Symonds | |
| 1,180,199 A | * 4/1916 | Smith | ........................... 132/114 |
| 1,382,586 A | 6/1921 | Wilson | |
| 1,413,320 A | 4/1922 | Charles | |
| 1,686,936 A | * 10/1928 | Simpson | ....................... 132/114 |

(Continued)

FOREIGN PATENT DOCUMENTS

DE 94 19 660 U 2/1995

(Continued)

OTHER PUBLICATIONS

English language Derwent Abstract of DE 199 54 450 A1, May 23, 2001.

(Continued)

*Primary Examiner* — Robyn Doan
(74) *Attorney, Agent, or Firm* — Connolly Bove Lodge & Hutz LLP

(57) ABSTRACT

An applicator nozzle may comprise an attachment portion configured to attach the nozzle to a receptacle configured to contain a product and an arrangement of at least two teeth disposed so as to form at least one row comprising first and second end teeth. At least one of the teeth of the arrangement may define a channel configured to be placed in flow communication with product contained in the receptacle. The channel may open on an exterior of the at least one tooth via at least one outlet aperture facing substantially in a direction of at least one adjacent tooth. The nozzle may further define at least one groove and the outlet aperture may open into the groove. The groove may extend from the outlet aperture substantially to a free extremity of the at least one tooth. The arrangement may be formed by a single molded piece and may be configured so as to present an obstacle to product flowing from the at least one outlet aperture beyond the first and second end teeth.

42 Claims, 5 Drawing Sheets

U.S. PATENT DOCUMENTS

| | | | | |
|---|---|---|---|---|
| 1,686,981 A | * | 10/1928 | Olson | 132/114 |
| 2,148,966 A | | 2/1939 | Schmidt | |
| 2,222,176 A | | 11/1940 | Hickey | |
| 2,270,528 A | * | 1/1942 | Kirschenbaum | 132/125 |
| 2,270,529 A | * | 1/1942 | Kirschenbaum | 132/125 |
| 2,270,530 A | * | 1/1942 | Kirschenbaum | 132/112 |
| 2,381,048 A | | 8/1945 | Habostad | |
| 2,446,398 A | | 8/1948 | Wilson | |
| 2,554,866 A | | 5/1951 | McCain et al. | |
| 2,607,355 A | | 8/1952 | Neal et al. | |
| 2,609,821 A | | 9/1952 | Weissberger | |
| 2,819,723 A | | 1/1958 | Meyer | |
| D184,445 S | | 2/1959 | Lerner | |
| D186,350 S | | 10/1959 | Lerner et al. | |
| 2,922,425 A | | 1/1960 | Lerner et al. | |
| 3,101,086 A | * | 8/1963 | Di Vito | 132/114 |
| 3,457,928 A | | 7/1969 | Kurshenoff | |
| 3,477,447 A | | 11/1969 | Eldredge | |
| 3,520,311 A | | 7/1970 | Iesersek et al. | |
| 3,863,650 A | | 2/1975 | De Maria | |
| 3,961,635 A | | 6/1976 | Miya | |
| 3,964,501 A | | 6/1976 | Matchett | |
| 4,310,009 A | | 1/1982 | Shipp | |
| 4,516,591 A | | 5/1985 | Hierholzer | |
| 4,605,026 A | | 8/1986 | Nolin | |
| 4,747,420 A | | 5/1988 | Alaimo | |
| 4,813,439 A | | 3/1989 | Morgan | |
| 4,987,909 A | | 1/1991 | Snyder | |
| 4,993,437 A | | 2/1991 | Kimura et al. | |
| 5,024,243 A | | 6/1991 | Snyder | |
| 5,054,504 A | | 10/1991 | Winrow | |
| 5,060,679 A | | 10/1991 | Christopher et al. | |
| 5,152,305 A | | 10/1992 | Niv | |
| 5,311,887 A | | 5/1994 | Ramsey | |
| 5,337,764 A | | 8/1994 | McKay | |
| 5,551,454 A | | 9/1996 | Goncalves | |
| 5,555,899 A | | 9/1996 | Foreman | |
| 5,755,241 A | | 5/1998 | Cheung | |
| D401,380 S | | 11/1998 | Steen et al. | |
| 5,845,651 A | | 12/1998 | de Nervo | |
| 5,947,130 A | | 9/1999 | Musum | |
| 6,000,405 A | | 12/1999 | De Laforcade | |
| 6,062,230 A | | 5/2000 | Kajgana | |
| D428,525 S | | 7/2000 | Gazzo | |
| 6,112,751 A | | 9/2000 | Bennett | |
| 6,260,557 B1 | | 7/2001 | Yarbrough | |
| 6,378,529 B1 | | 4/2002 | Clemente Marco | |
| 6,637,440 B2 | | 10/2003 | de Laforcade | |
| 2001/0029960 A1 | | 10/2001 | Asano | |

FOREIGN PATENT DOCUMENTS

| | | | |
|---|---|---|---|
| DE | 199 54 450 A1 | | 5/2001 |
| FR | 2 769 806 | | 4/1999 |
| FR | 2 776 629 | | 10/1999 |
| JP | 60-33903 U | | 3/1985 |
| JP | 3-7302 U | | 1/1991 |
| JP | 9-66246 A | | 3/1997 |
| JP | A 9-327325 | | 12/1997 |
| JP | 11-332636 | | 12/1999 |
| JP | A 2001-234 | | 1/2001 |
| JP | 2001-158464 | | 6/2001 |
| JP | A 2001-275739 | | 10/2001 |
| JP | 2002-136332 | | 5/2002 |
| JP | 2002159325 A | * | 6/2002 |
| WO | WO 99/26509 | | 6/1999 |
| WO | WO 99/26510 | | 6/1999 |

OTHER PUBLICATIONS

English language abstract of JP 11-332636, Dec. 7, 1999.
English language Derwent Abstract of JP 9-66246, Mar. 11, 1997.
Packaging materials and use instruction sheet (5 pages) and photographs (4 photographs) of nozzle component of "Beautylabo" hair product application arrangement.
English language translation of FR 2,769,806.

\* cited by examiner

APPLICATOR NOZZLE AND APPLICATOR ASSEMBLY INCORPORATING SUCH A NOZZLE

This application claims the benefits of priority of U.S. Provisional Application No. 60/398,565, filed Jul. 26, 2003, and U.S. Provisional Application No. 60/398,570, filed Jul. 26, 2002.

The invention relates to an applicator assembly that comprises an applicator nozzle which may facilitate the application of a product. More specifically, the applicator nozzle may be configured so as to facilitate the application of a product, such as a cosmetic product, for example, to hair on an individual's head.

More specifically, the subject matter discussed herein relates to applicator nozzles designed to be mounted on a receptacle containing a product, such as a cosmetic product to be applied to the hair, for example, that may comprise a means designed to attach the nozzle onto the receptacle and an arrangement of teeth disposed in row including first and second end teeth. The teeth in the row may define a passage capable of being in flow communication with the product contained in the receptacle. The passage may lead to an outlet through which product flows for application to a surface.

Numerous examples of applicator nozzles of this type are known. For example, in one conventional design, a nozzle composed of several molded parts includes a first part incorporating two lengthwise teeth at the transverse extremities of the nozzle and a means for attaching the first part to a receptacle. The nozzle also includes at least one second intermediate part designed to be assembled with the first, and including intermediate hollow teeth incorporating outlet apertures. The intermediate hollow teeth are disposed between the two teeth located at the extremities.

Such a design may be relatively costly to implement since it calls for the use of two separate sets of molds, one for the first part and the other for the second intermediate part. Further, the first and second parts must be assembled together, which may increase the manufacturing costs and complexity for such an applicator nozzle.

German patent document DE 9419660 also describes a nozzle composed of several parts.

According to another conventional design, a nozzle composed of a single molded part is molded via a mold configured to form the outside wall of the applicator nozzle and a first core designed to form the tooth channels. A second mobile core then passes transversely through the whole of the mold and first core to form outlet apertures on the teeth. The result is an applicator nozzle wherein the end teeth, which are traversed by the second core during molding, have outlet apertures on their respective exterior lateral surfaces. For this reason, such an applicator nozzle may be imprecise and even messy in use because the cosmetic product may run out onto the external lateral sides of the transverse end teeth.

Other known one-piece nozzles include end teeth that have outlet apertures. In such nozzles, the apertures emerge onto the smooth sides of the teeth. When the product leaves the outlet apertures, it thus may be distributed randomly between the teeth without following a particular direction and may slide along the teeth regardless of its viscosity. Because of this, product potentially may reach the scalp without properly penetrating the part of the hair between two adjacent teeth.

In document DE 9419660, the apertures emerge into a groove extending to the free extremity of the tooth. The aperture emerges at this free extremity of the tooth.

SUMMARY

The invention disclosed herein may remedy, at least partially, some of the drawbacks of conventional applicator nozzles.

In the following description, certain aspects and embodiments of the present invention will become evident. It should be understood that the invention, in its broadest sense, could be practiced without having one or more features of these aspects and embodiments. It should also be understood that these aspects and embodiments are merely exemplary.

As embodied and broadly described herein, one exemplary aspect of the invention includes an applicator nozzle comprising an attachment portion configured to attach the nozzle to a receptacle configured to contain a product. The applicator nozzle may further include an arrangement of at least two teeth disposed so as to form at least one row comprising first and second end teeth. At least one of the teeth of the arrangement may define a channel configured to be placed in flow communication with product contained in the receptacle. The channel may open on an exterior of the at least one tooth via at least one outlet aperture facing substantially in a direction of at least one adjacent tooth. The nozzle may define at least one groove and the outlet aperture may open into the groove. The groove may extend from the outlet aperture substantially to a free extremity of the at least one tooth.

According to an exemplary aspect, the arrangement may be formed by a single molded piece. In another exemplary aspect, the arrangement may be configured so as to present an obstacle to product flowing from the at least one outlet aperture beyond said first and second end teeth.

According to yet another exemplary aspect, an applicator nozzle may comprise an attachment portion configured to attach the nozzle to a receptacle configured to contain a product and an arrangement of at least two teeth disposed in at least one row comprising first and second end teeth. At least one of the teeth of the arrangement may define a channel configured to be placed in flow communication with product in the receptacle and the channel may open on an exterior of the at least one tooth via at least one outlet aperture facing in a direction of at least one adjacent tooth. The at least one tooth may define at least one groove having a first end into which the at least one outlet aperture opens and a second end located substantially at a free extremity of the at least one tooth.

Yet another exemplary aspect of the invention includes an applicator nozzle comprising an attachment portion configured to attach the nozzle to a receptacle configured to contain a product and an arrangement of at least two teeth disposed in at least one row comprising first and second end teeth. At least one of the teeth of the arrangement may define a channel configured to be placed in flow communication with product contained in the receptacle. The channel may open on an exterior of the tooth via at least one outlet aperture facing in the direction of an adjacent tooth. The arrangement may be formed by a single molded piece and may be configured so as to present an obstacle to flow of product from the outlet aperture beyond the first and second end teeth. The end teeth in this arrangement may be devoid of outlet apertures.

Yet another exemplary aspect includes an applicator nozzle comprising a plurality of teeth, at least one of the teeth defining a channel configured to be placed in flow communication with a receptacle containing a product. The applicator nozzle may further comprise at least one outlet aperture in flow communication with the channel. The outlet aperture may open to an exterior of the tooth on an external lateral surface of the at least one tooth. The application nozzle may further comprise at least one groove configured to receive product exiting the at least one outlet aperture. The groove may extend from the outlet aperture substantially to a free extremity of the at least one tooth and may face an adjacent tooth.

An additional exemplary aspect according to the invention, includes an applicator nozzle comprising at least two teeth arranged in at least one row. At least one tooth of the row may have at least one outlet aperture configured to permit product to flow therethrough for application to a surface and at least one other tooth of the row may be devoid of any outlet aperture. The at least two teeth may be formed from a single molded piece and the outlet aperture may face in a direction of an adjacent tooth.

According to a further exemplary aspect, an applicator nozzle comprises a row of teeth formed by a single molded piece construction. The row of teeth may comprise at least one tooth defining a channel configured to allow product to flow therethrough. The channel may open on an exterior of the tooth via at least one outlet aperture facing in a direction of an adjacent tooth. A first end tooth located at a first end of the row and a second end tooth located at a second end of the row may be devoid of any respective outlet apertures facing in a direction away from an adjacent tooth.

In another exemplary embodiment, the at least one groove may extend substantially along a length of the tooth. The groove may have a first end and a second end located substantially at the free extremity of the at least one tooth. The groove may be spaced from the free extremity. The aperture may open into the groove at its first end.

In an exemplary embodiment, the grooves may be configured to channel the product exiting the outlet aperture and, alternatively or in addition, to slow down the product droplets, for example, at least by capillary action, as the droplets move toward the free extremity of the at least one tooth so as to prevent, or hinder, product from reaching the scalp. The groove may be substantially elongate.

According to an exemplary aspect, the applicator nozzle may at least partially remedy drawbacks of conventional applicator nozzles due to the arrangement being formed by a single molded piece configured so as to present an obstacle to any outflow of product from said outlet aperture, for example, in the direction of the outlet aperture, beyond said first and second end teeth, the end teeth being devoid of outlet apertures in an exemplary aspect.

In an exemplary embodiment, the arrangement can include at least one intermediate tooth placed between the first and second end teeth and the intermediate tooth may define the channel. As an example, the at least one intermediate tooth may define a channel opening on an exterior of the at least one intermediate tooth via two outlet apertures facing in opposite directions.

The end teeth may be devoid of outlet apertures facing in a respective direction away from a respective adjacent tooth. As an example, the end teeth can be devoid of outlet apertures altogether, for example the end teeth may be solid.

In an exemplary embodiment, the at least one outlet aperture may be disposed proximate a free extremity (free end) of the tooth. For example, the outlet aperture may be placed nearer to the free extremity of the tooth than its base. The outlet aperture also may be spaced from, but near, the free extremity.

The attachment portion can comprise screw threading configured to engage with screw threading associated with the receptacle, such as, for example, screw threading associated with a neck portion of the receptacle.

According to an exemplary aspect, the at least one aperture is located on a lateral surface of the at least one tooth. According to another exemplary aspect, the channel may extend substantially along a length of the at least one tooth.

In another exemplary embodiment, the arrangement is configured so as to present an obstacle to product flowing substantially on respective sides of the end teeth facing away from adjacent teeth. For example, the arrangement may be configured to present an obstacle to product flowing in a direction of the at least one aperture.

The nozzle may be configured to apply product, such as a cosmetic product, for example, to hair on an individual's head.

According to a further exemplary aspect, there is an applicator assembly comprising a receptacle configured to contain a product and an application nozzle, such as an application nozzle described above, associated, for example, attached, with the receptacle. A product, for example, a cosmetic product, may be contained in the receptacle. The product may be intended for application to hair on an individual's head.

In an exemplary aspect, the receptacle may comprise a tube, which may be deformable, for example.

According to yet a further exemplary aspect, the invention relates to a mold for molding an applicator nozzle, such as an applicator nozzle described above, for example. An exemplary configuration of such a mold may comprise a female mold element comprising a first portion configured to form an attachment portion of the applicator nozzle. The attachment portion may be configured to be attached to a receptacle. The female mold element may also comprise at least one second portion extending from the first portion and being configured to form at least one tooth of the applicator nozzle. The mold may further comprise a male mold element forming a core configured to be inserted into the female mold element. The male mold element may comprise a first part configured to be received within the first portion of the female mold element to form the attachment portion, and at least one second part configured to be received within the second portion of the female mold element so as to form a channel within the at least one tooth. The at least one second part of the male mold element and the at least one second portion of the female mold element being configured so as to form at least one outlet aperture disposed on a side of the tooth facing an adjacent tooth.

The mold may further be configured such that the at least one second portion of the female mold element comprises a boss on an inner lateral surface thereof. The boss may project toward a center of the at least one second portion and may extend from allocation spaced from an end of an interior of the at least one second portion to the end of the interior of the at least one second portion so as to form a groove and part of the at least one outlet aperture of the tooth.

According to an exemplary embodiment, one end of the at least one second part of the male mold element is configured to fit with an end of the boss that is spaced from the end of the interior of the second portion of the female mold element so as to form another part of the at least one outlet aperture of said hollow tooth.

The female mold element may further comprise two second end portions extending from the first portion of the female mold element, the two second end portions being configured to form solid end teeth of the applicator nozzle, and the at least one second portion of the female element being disposed between the two second end portions. The at least one second portion may be designed to form at least one hollow tooth and may have bosses on opposing inner lateral surfaces configured to form two opposite facing grooves and a part of two opposite facing outlet apertures of the hollow tooth.

According to an exemplary embodiment, an end of the at least one second part of the male mold element is configured to be inserted between end portions of the bosses that are spaced at a distance from ends of the interiors of the second portions of the female mold element so as to form the other part of the opposite facing outlet apertures of said hollow tooth. In yet another exemplary embodiment, the cross-section of each boss viewed in a plane perpendicular to a lengthwise direction of the at least one second portion of the female mold element is substantially constant or decreasing toward a boss end spaced from an end of an interior of the second portion.

Yet another exemplary embodiment of the mold includes the female mold element and the male mold element each comprising an alignment portion configured to engage with each other during assembly of the male mold element and the female mold element. The alignment portion may comprise, for example, at least three guide posts oriented substantially along a length of the mold. The guide posts may be integral with one of the male or female mold elements and the other of the female or male mold elements may be configured to slide on the guide posts during assembly of the mold.

The at least one second part of the male mold element and the at least one second part of the female mold element may further be configured to form a groove on an external surface of the tooth.

According to yet another exemplary aspect, a method for molding an applicator nozzle, for example, an applicator nozzle as described above, may include providing a mold, which may be of the type described above, for example, inserting the male element into the female element, injecting a moldable material between the female and male elements, and separating the female element and the male element. The method may further include ejecting the molded applicator nozzle from the mold.

The method may further include curing the moldable material. The moldable material may comprise a polymer material, for example.

BRIEF DESCRIPTION OF DRAWINGS

Besides the structural and procedural arrangements set forth above, the invention could include a number of other arrangements, such as those explained hereinafter. It is to be understood that both the foregoing description and the following description are exemplary.

The accompanying drawings are included to provide a further understanding of the invention and are incorporated in and constitute a part of this specification. The drawings illustrate exemplary embodiments of the invention and, together with the description, serve to explain certain principles. In the drawings.

DESCRIPTION OF EXEMPLARY EMBODIMENTS

Figure 1:
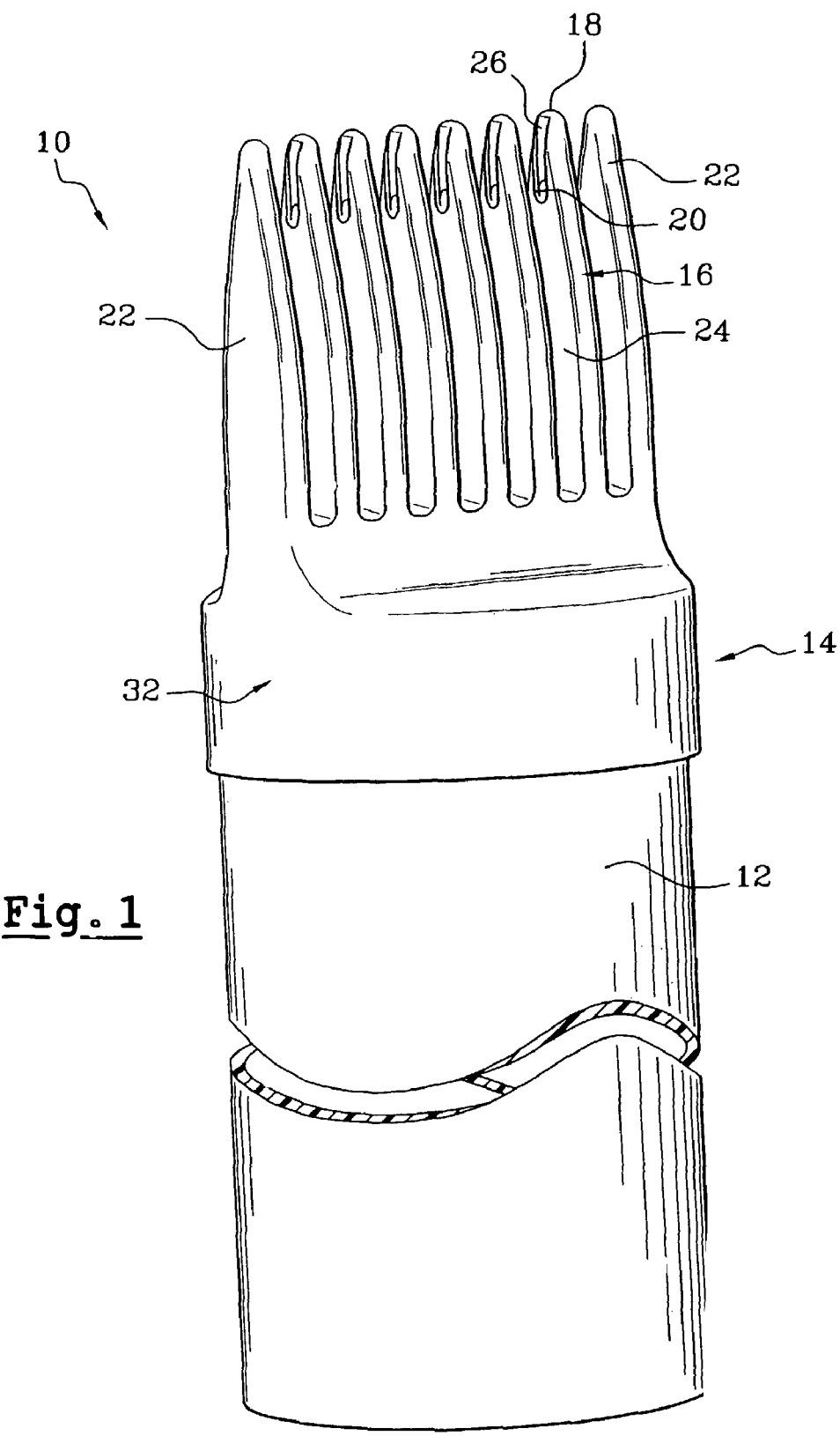
FIG. 1 is a perspective view of an exemplary embodiment of an applicator assembly including a receptacle and an applicator nozzle.

Reference will now be made in detail to exemplary embodiments of the invention, examples of which are illustrated in the accompanying drawings. Wherever possible, the same reference numbers are used in the drawings and the description to refer to the same or like parts, and the same reference numbers with alphabetical suffixes and/or superscripts are used to refer to similar parts.

As used herein, the terms "front", back", "upper" and lower" designate elements or positions oriented respectively to the left, right, top or bottom of FIGS. 1 to 5.

FIG. 1 illustrates an applicator assembly 10 for applying a product, for example a cosmetic product, such as Da colorant, for example, to the hair on an individual's head.

The assembly 10 may include a receptacle 12 containing the product and an applicator nozzle 14 attached to the receptacle 12. In an exemplary aspect, the nozzle 14 may be attached to the receptacle 12 via an-attachment portion.

The receptacle 12 may be a flexible (e.g., deformable) container, such as, for example, a tube which is configured to be squeezed so as to cause the product to pass through the internal channels of the nozzle 14 and emerge via the outlet aperture 20.

Figure 2:
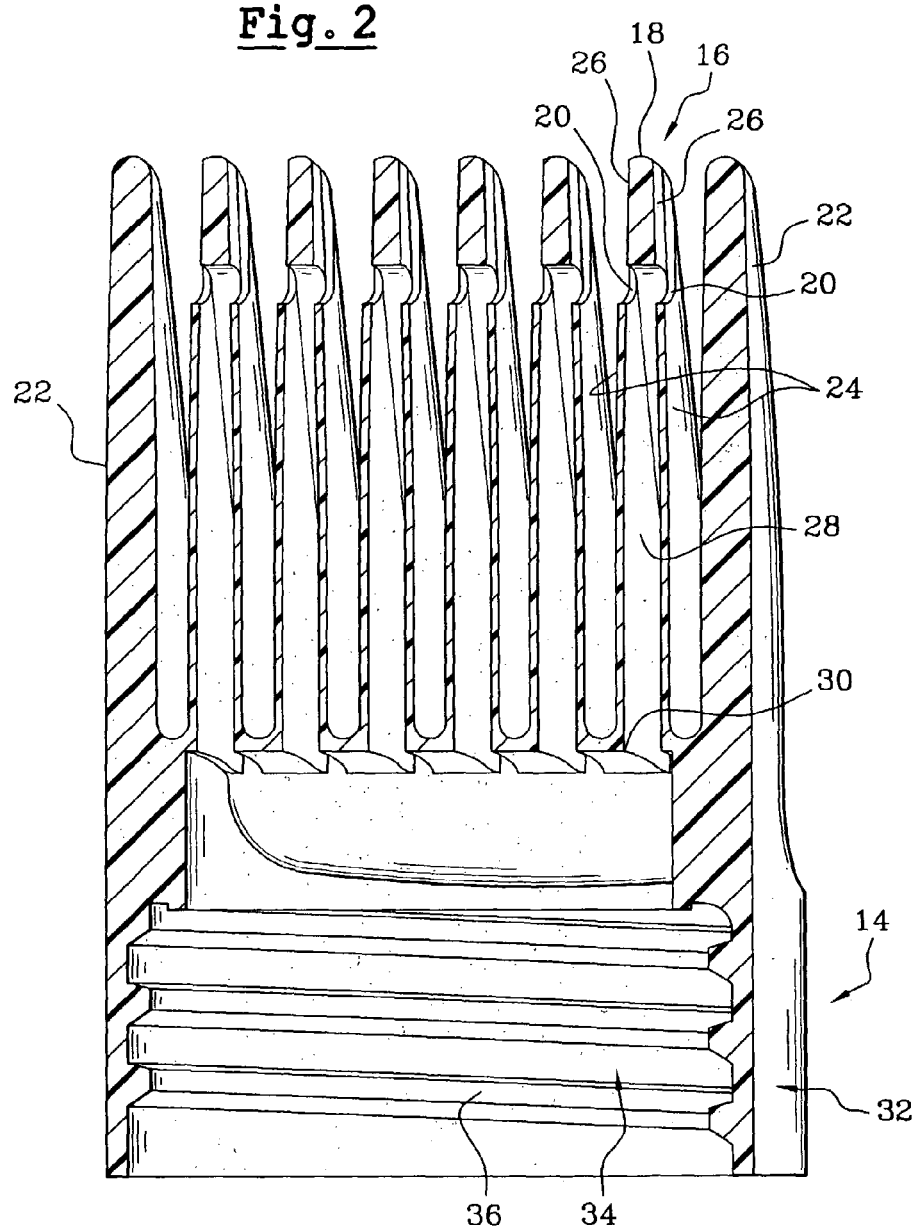
FIG. 2 is a partial, transverse sectional view of the applicator nozzle of FIG. 1.

A non-limiting, exemplary embodiment of the applicator nozzle 14 is shown in FIG. 2. The nozzle 14 comprises an arrangement of teeth 16, 22 disposed in a substantially transverse row. The teeth 16, 22 are oriented substantially lengthwise. At its transverse extremities, the row of teeth may comprise at least two solid end teeth 22. Between the solid teeth 22, there may be at least one hollow intermediate tooth 16. The hollow tooth 16 may define an internal channel 28 configured to be in flow communication with the product contained in the receptacle 12 when the nozzle 14 is attached to the receptacle 12. The channel 28 may extend substantially along a length of the intermediate tooth 16. For example, the channel 28 may extend to near a free extremity 18 (e.g. free end) of the tooth 16. At least one outlet aperture 20, for example, a lateral outlet aperture that opens on an exterior of the tooth may serve to place the channel 28 in flow communication with the external environment.

According to an exemplary aspect, the arrangement of teeth is configured so as to present an obstacle to outflow of product from the outlet aperture 20 beyond the respective end teeth 22. For example, the arrangement may be configured to present an obstacle to product flowing in the direction of the outlet aperture 20 once it has exited the outlet aperture 20. In this manner, substantially all of the product to be applied may flow within the space delineated between the end teeth 22. This may assist in relatively precise application of the product.

In an exemplary embodiment the end teeth 22 are devoid of outlet apertures 20 on their outer sides, i.e. on their respective sides that face opposite (e.g. away from) the intermediate teeth 16, but they may have outlet apertures on their respective sides facing adjacent teeth. The product emerging from the apertures 20 thus-may at least be hindered from flowing in the direction of the apertures 20 beyond the end teeth 22. Thus, only product which has already been applied to the hair in contact with the outer sides of the end teeth 22 may be permitted to flow on the sides of the applicator assembly.

According to another exemplary embodiment, as shown in FIG. 1, for example, the end teeth 22 may be devoid of any outlet apertures 20, including outlet apertures facing respective adjacent teeth. In this manner, product may be prevented, from flowing from the first and second end teeth 22, and thereby also may be prevented from flowing onto the outer sides of the first and second end teeth 22 and the applicator assembly. In an exemplary embodiment, the end teeth 22 which are devoid of outlet apertures are solid, in which case it may be possible to avoid build-up of product within the tooth.

Though the end teeth 22 may be devoid of outlet apertures 20, those outlet apertures 20 may at least be placed on the intermediate teeth 16. For example, the outlet apertures may be present on one or both sides of the teeth 16 facing toward at least one respective adjacent tooth.

At least one elongate groove 26 may extend from each aperture 20 substantially to the extremity 18 of the tooth 16. This may facilitate uniform application of the product. The groove 26 may have a first end at which the outlet aperture 20 emerges and a second end, opposite the first, corresponding to approximately the free extremity of the tooth 16. In an exemplary embodiment, the groove 26 may be spaced from, yet near, the free extremity of the tooth 16.

In the exemplary embodiment of FIG. 1, the applicator nozzle 14 has six hollow intermediate teeth 16 disposed transversely between two solid end teeth 22. This arrangement may facilitate relatively broad application of product onto the hair being treated. This arrangement is not limitative of the invention, however, and the applicator nozzle 14 can include a larger or smaller number of hollow teeth 16 which may be selected as desired based on factors such as the viscosity of product being applied, the particular application for which the nozzle is being used, and other such factors, for example.

The applicator nozzle 14 is illustrated in more detail in FIG. 2. As can be seen, each hollow tooth 16 defines an internal channel 28 extending substantially from the base 30 of the tooth 16 and an intermediate part of the tooth set away from its free extremity 18. The channel 28 communicates with two outlet apertures 20 on each respective opposite facing lateral side 24 of the tooth 16. That is, the channel 28 opens on an exterior of the respective hollow tooth 16 via each outlet aperture 20. Each outlet aperture 20 also may communicate on the exterior of the tooth with a groove 26. The respective grooves 26 may be configured to receive product that flows from the each respective outlet aperture 20. The length of the grooves 26 may be selected so as to promote a desired capillary dispersion of the product between two adjacent teeth 16, for example, so that the hair interposed between two adjacent teeth 16 can be amply coated with the product. In an exemplary aspect, the product may effectively have viscosity characteristics tending to form a film of product held between the facing grooves 26 of two adjacent teeth 16.

By way of example, each tooth 16, 22 may have a length of about 25 mm. The spacing between teeth 16 and 22 may be about 2 mm, as measured below the apertures 20. The apertures 20 may be located about 5 mm from the extremity 18 of the teeth 16. The groove 26 may be about 0.5 mm deep. Of course, these dimensions are not intended to be limiting and other dimensions may be suitable and may be chosen as desired.

Each groove 26 thus may serve to guide the product in the direction of the groove 26 between the teeth 16 and away from the outlet aperture 20. In addition, by virtue of its depth, the groove 26 may increase the free space between two adjacent teeth 16. Each groove 26 may thereby slow the descent of the product droplets by capillary action to allow the product to impregnate the hair prior to reaching the scalp.

As illustrated in FIG. 1, the applicator nozzle 14 also may include a part 32 from which the hollow teeth 16 and solid teeth 22 extend. The part 32 may have a substantially cylindrical shape, for example. The part 32 may be associated with an attachment portion for attaching the nozzle 14 to a neck portion (the portion underneath the part 32) of the receptacle 12.

As illustrated more particularly in FIG. 2, an internal cavity 34 in the part 32 is in flow communication with the internal channels 28 in the hollow intermediate teeth 16 and may coincide with the neck portion of the receptacle 12 previously shown in FIG. 1.

In an exemplary embodiment, the internal cavity 34 may be cylindrical, like the lower part 32, and may incorporate screw threading 36 designed to engage with screw threading on the periphery of the neck portion of the receptacle 12 to attach the nozzle 14 to the receptacle 12. This configuration may allow the applicator nozzle 14 to be readily attached to the receptacle 12. Of course other attachment mechanisms, such as snap-fasteners and other interlocking mechanisms, for example, also may be used and are considered within the scope of the invention. Moreover, in an exemplary aspect, the nozzle 14 may be forged integrally within the receptacle 12.

Figure 3:
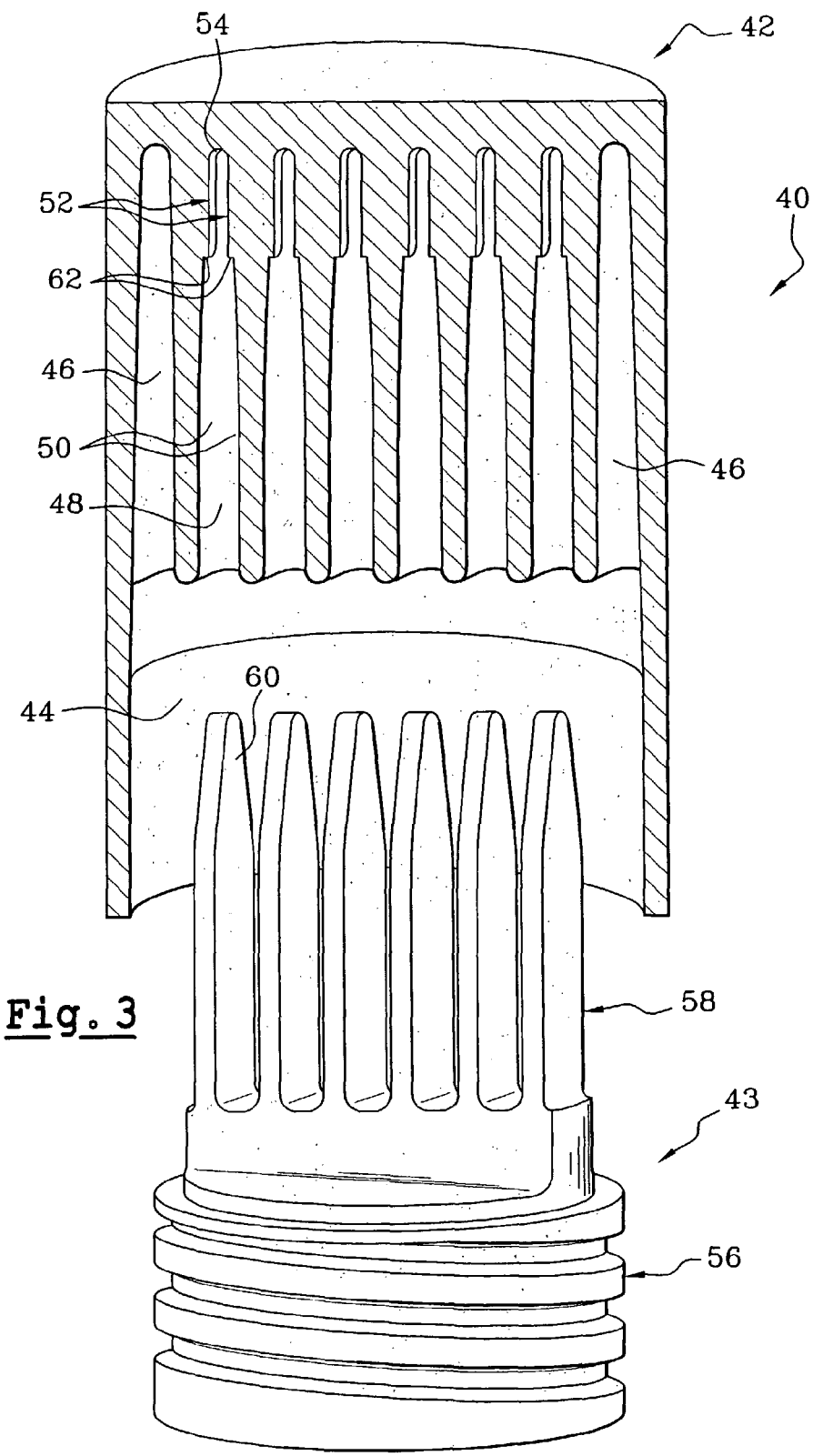
FIG. 3 is a perspective view of an exemplary embodiment of a mold for making the applicator nozzle of FIG. 1.
Figure 4:
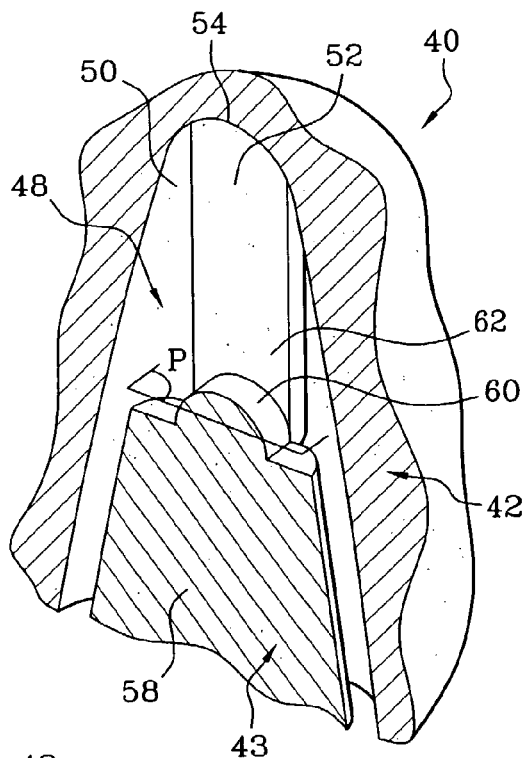
FIG. 4 is a detail sectional view taken in a plane perpendicular to the transverse direction of the mold of FIG. 3.
Figure 5:
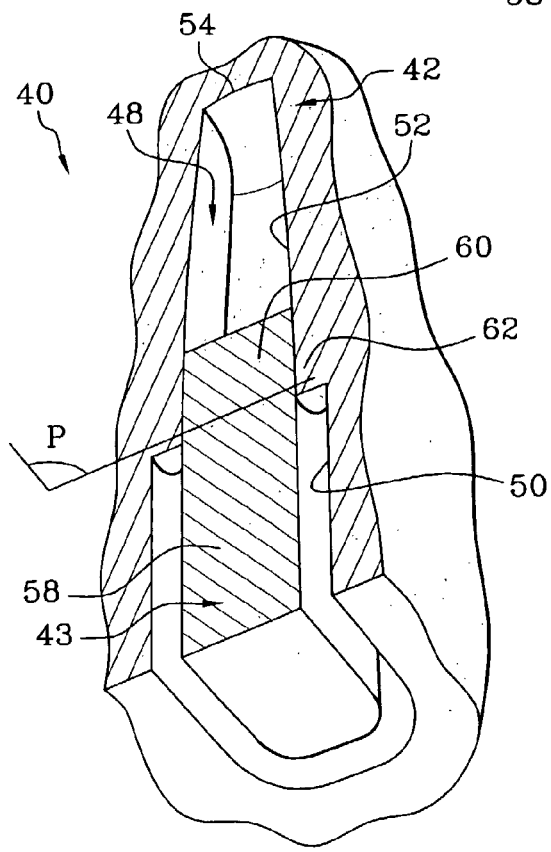
FIG. 5 is a detail sectional view taken in a lengthwise and transverse plane of the mold of FIG. 3.

According to an exemplary embodiment, the applicator nozzle 14 may be a one-piece component produced by a molding process. FIGS. 3-5 illustrate an exemplary embodiment of a mold 40 for use in molding an applicator nozzle, such as the applicator nozzle 14 described above.

As shown in FIGS. 3-5, the mold 40 may comprise a one-piece female mold element 42 and a one-piece male mold element 43 forming a core. As shown in FIG. 3, the female mold element 42 may include a first lower portion 44 designed to form the part 32 of the applicator nozzle 14. The female mold element 42 may further include two upper end portions 46 extending from the lower portion 44 and designed to form the solid end teeth 22 placed at the transverse extremities of the arrangement of teeth of the applicator nozzle 14. Further, the female mold element 42 may include at least one second intermediate portion 48 (e.g. 6 intermediate parts in FIG. 3) located between the upper end portions 46, extending from the lower portion 44 and designed to form the hollow teeth 16. The inner lateral sides 50 of intermediate portion 48 may incorporate bosses 52 oriented lengthwise and projecting inward into the upper intermediate portion 48. The bosses 52 may extend substantially along a length of the intermediate portion 48 between an intermediate part of the intermediate portion 48 and an upper end 54 of the interior surface of the intermediate portion 58 so as to form the groove 26 and a part of the outlet apertures 20 of the teeth 16.

The one-piece male mold element 43 forming a core may include a lower part 56 which fits relatively loosely into the lower portion 44 of the female mold element 42 to form the internal cavity 34 of the cylindrical part 32. Further, the male mold element 43 may comprise at least one upper part 58 which fits relatively loosely into the upper intermediate portion 48 of the female element 42 so as to form the internal channel 28 of the intermediate tooth 16.

In addition, the second upper intermediate portion 48 of the female mold element 42 and the upper intermediate part 58 of the male mold element 43 may be shaped to work together to form the outlet aperture 20 of the intermediate tooth 16. For example, as illustrated in FIGS. 4 and 5, one end 60 of each upper part 58 of the male mold element 43 may be designed to fit snugly between the ends 62 of the bosses 52 located in the intermediate part of each upper intermediate portion 48 of the female mold element 42 to form the outlet apertures 20 of the intermediate tooth 16.

The cross-section of each boss 52 viewed in a plane "P" perpendicular to the lengthwise direction of the upper intermediate portion 48 of the associated female mold element 42 may be either constant or may decrease towards its inner end 62 situated in the intermediate part of each upper intermediate portion 48 of the female mold element 42. As will be explained shortly, this configuration may facilitate demolding of the associated intermediate tooth 16 by a vertical upward movement of the female mold element 42.

It is to be understood that the one-piece female mold element 42 and the one-piece male mold element 43 each incorporates alignment portions designed to engage with each other during assembly of the mold 40. These alignment portions are at least composed of the upper extremity 60 of each upper part 58 of the male mold element 43 engaging with the ends 62 of the bosses 52 located in the intermediate part of each upper intermediate portion 48 of the female mold element 42. However, the alignment portions may also be composed of other structures. For instance, the alignment portions may include at least three guide posts oriented substantially lengthwise and integral with one of the male or female mold elements 42, 43. The other female or male mold element 42, 43 may be configured so as to slide along the guide posts during assembly of the mold 40.

Figure 6A:
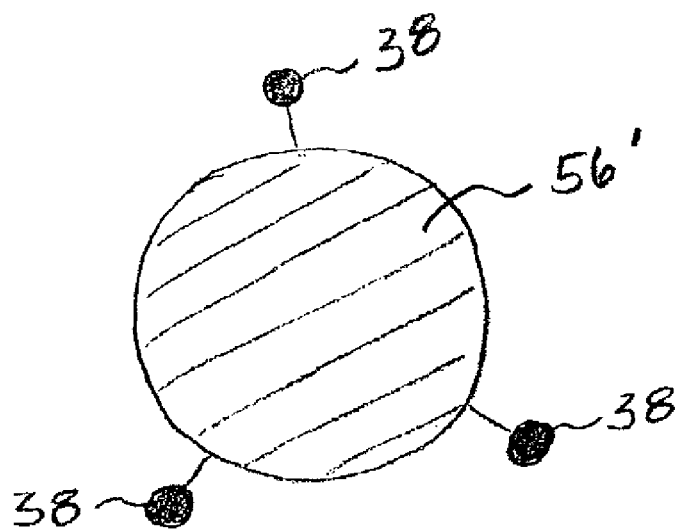
FIG. 6A is a schematic, cross-sectional view of an exemplary embodiment of a lower part of a male mold element.
Figure 6B:
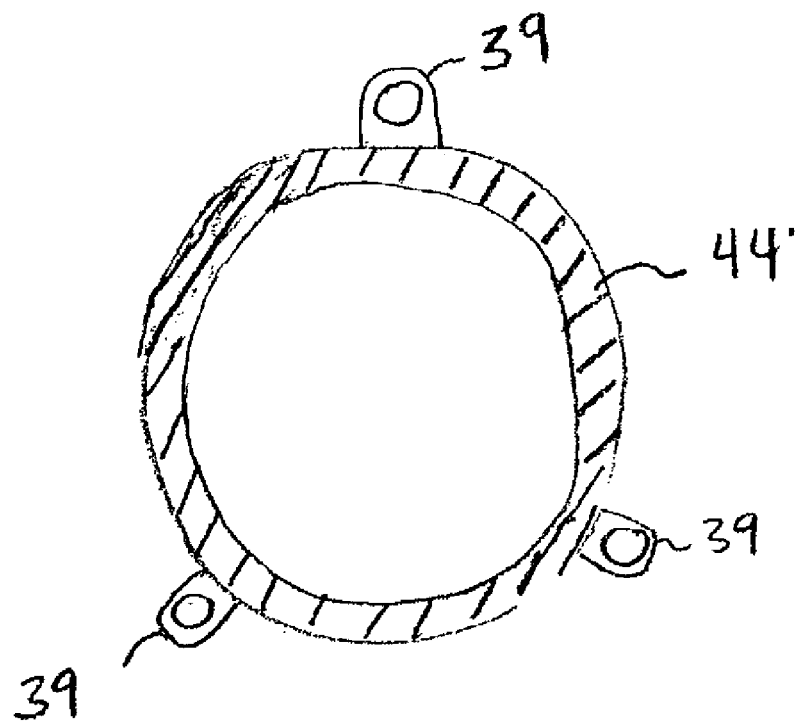
FIG. 6B is a schematic, cross-sectional view of an exemplary embodiment of a lower portion of a female mold element.

An exemplary embodiment of a mold having an alignment portion in the form of guide posts and corresponding members configured to receive the guide posts in a sliding arrangement is shown in FIGS. 6A and 6B. FIG. 6A depicts a schematic cross-sectional view of the lower part 56' of a male mold element. Lower part 56' is similar to lower part 56 depicted in FIG. 3 except that disposed substantially equidistant around the perimeter of the lower part 56' are three guide posts 38. FIG. 6B depicts a schematic cross-sectional view of a lower portion 44' of a female mold element. Lower portion 44' is similar to the lower portion 44 depicted in FIG. 3 except that disposed substantially equally spaced around a perimeter of lower portion 44' are three receiving members 39 which are configured to receive the guide posts 38 on lower part 56' in a slidably engaging manner so as to assist in aligning the female and male mold elements. The embodiment depicted in FIGS. 6A and 6B is exemplary only and other configurations, including number and location, may be selected as desired. For example, the guide posts 38 may be placed on the female mold element and the receiving members 39 may be placed on the male mold element.

According to an exemplary embodiment, the mold 40 may be designed to facilitate the production of a large number of applicator nozzles 14 in a single molding operation and therefore includes a plurality of the male and female mold elements 42, 43 defining a plurality of mold cavities. The alignment portion in this exemplary aspect may include four posts placed at the four corners of one of the male and female mold elements 42, 43, and the other of the female and male mold element 42, 43 may be configured to slide on the posts during assembly of the mold 40.

In this configuration, a process for molding an applicator nozzle, for example the applicator nozzle 14 described above, using a mold, for example the mold 40 described above, may include successively a stage in which the female mold element 42 is fitted lengthwise, and also possibly vertically, onto the male mold element 43. Next, moldable material, such as a polymer material, for example, may be injected into the mold cavity defined by the female and male elements 42, 43 and may be permitted to cure. After curing, the female mold element 42 may be separated lengthwise from the male mold element 43, and the applicator nozzle may be ejected from the mold 40.

Any known mechanism may be used to implement the ejection of the applicator nozzle 14. For instance, methods of ejection by vibration or compressed air may be used to achieve rapid ejection of the applicator nozzles 14.

The exemplary embodiments of the mold, molding process, and applicator nozzle described above may therefore create an applicator assembly 10 capable of promoting an efficient application of a product, for example a cosmetic product to hair on an individual's head. In addition, the applicator assembly may be produced in a mass production environment.

Throughout the description, including the claims, it is to be understood that the expression "including one" is synonymous with "including at least one" unless otherwise specified.

Though the various devices, assemblies, and methods disclosed have been described in conjunction with their use for applying a product to hair, it is contemplated that the devices, systems, and methods could be utilized in the application of a variety of other types of products, including a variety of cosmetic and care products. Furthermore, the sizes of various structural parts and materials used to make these parts are illustrative and exemplary only and one of ordinary skill in the art would recognize that these materials and sizes can be changed as necessary to produce different effects or desired characteristics of the applicator device.

It will be apparent to those skilled in the art that various modifications and variations can be made to the structure and methodology. Thus, it should be understood that the invention is not limited to the examples discussed in the specification. Rather, the present invention is intended to cover modifications and variations.

What is claimed is:

1. An applicator nozzle comprising:
an attachment portion configured to attach the nozzle to a receptacle configured to contain a product; and
an arrangement of at least five teeth disposed so as to form a single row comprising
first and second end teeth, and
at least three intermediate teeth positioned directly next to one another, the at least three intermediate teeth being between the first and second end teeth, each of the intermediate teeth defining a channel extending lengthwise along each of the intermediate teeth and being configured to be placed in flow communication with product contained in the receptacle, the channel opening laterally on an exterior of each of the intermediate teeth via at least one outlet aperture facing substantially in a direction of at least one adjacent tooth,
wherein each of the intermediate teeth define at least one groove,
wherein the outlet aperture opens into the groove at a first end of the groove,
wherein the groove extends lengthwise relative to each of the intermediate teeth from the first end of the groove substantially to a second end of the groove at a free extremity of each of the intermediate teeth,
wherein the arrangement is formed by a single molded piece,
wherein the arrangement is configured so as to present an obstacle to product flowing from the at least one outlet aperture, in the direction of the at least one aperture, beyond said first and second end teeth,
wherein the first and second end teeth are devoid of any outlet aperture,
wherein the first and second end teeth are the only teeth in the row devoid of any outlet aperture, wherein the nozzle does not have any row of teeth other than the single row of teeth formed by the arrangement of at least three five teeth, wherein the nozzle is configured to apply product to hair on an individual's head, and wherein the at least five teeth of the arrangement include teeth tip free ends that are in a substantially linear alignment, and wherein the outlet apertures of each of the at least three intermediate teeth are in a substantially linear arrangement, and wherein the groove of each of the intermediate teeth has a length that promotes capillary dispersion of said product between two adjacent teeth.

2. The applicator nozzle of claim 1, wherein the channel of each of the intermediate teeth opens on the exterior of the at least one intermediate teeth via two outlet apertures facing in opposite directions.

3. The applicator nozzle of claim 1, wherein the first and second end teeth are solid.

4. The applicator nozzle of claim 1, wherein the attachment portion comprises screw threading configured to engage with corresponding screw threading associated with the receptacle.

5. The applicator nozzle of claim 4, wherein the screw threading of the attachment portion is configured to engage with screw threading on a neck portion of the receptacle.

6. The applicator nozzle of claim 1, wherein the arrangement is
configured so as to present an obstacle to product flowing substantially on respective sides of the end teeth facing away from adjacent teeth.

7. The applicator nozzle of claim 1, wherein the groove is substantially elongate.

8. The applicator nozzle of claim 1, wherein
each of the at least three intermediate teeth defines an outlet aperture facing in the same direction.

9. An applicator assembly, comprising: a receptacle configured to contain a product; and
the applicator nozzle of claim 1 attached to the receptacle.

10. The applicator assembly of claim 9, further comprising a product contained in the receptacle.

11. The applicator assembly of claim 10, wherein the product is a cosmetic product.

12. The applicator assembly of claim 10, wherein the product is a product intended for application to hair on an individual's head.

13. The applicator assembly of claim 9, wherein the receptacle comprises a tube.

14. The applicator assembly of claim 13, wherein the tube is deformable.

15. An applicator nozzle comprising:
an attachment portion configured to attach the nozzle to a receptacle configured to contain a product; and
an arrangement of at least four teeth disposed in a single row comprising first and second end teeth, and
at least two intermediate teeth positioned directly next to one another in the row, the at least two intermediate teeth being between the first and second end teeth, the at least two intermediate teeth comprising at least one intermediate tooth defining a channel extending lengthwise along the intermediate tooth and being configured to be placed in flow communication with product in the receptacle, the channel opening laterally on an exterior of the intermediate tooth via at least one outlet aperture facing in a direction of at least one adjacent tooth, wherein the intermediate tooth defines at least one groove, wherein the at least one outlet aperture opens into the groove, wherein the arrangement is formed by a single molded piece, wherein the arrangement is configured so as to present an obstacle to product flowing from the at least one outlet aperture, in the direction of the at least one aperture, beyond said first and second end teeth, wherein the first and second end teeth are devoid of any outlet aperture, wherein the first and second end teeth are the only teeth in the row devoid of any outlet aperture, wherein each of the at least two intermediate teeth of the row defines an aperture facing in the same direction, wherein the nozzle does not have any row of teeth other than the single row of teeth formed by the arrangement of at least four teeth, wherein the nozzle is configured to apply product to hair on an individual's head, and wherein the at least four teeth of the arrangement include teeth tip free ends that are in a substantially linear alignment, and wherein a transverse length of the row of teeth is substantially the same as an outer diameter of the attachment portion, and wherein the groove of each of the intermediate teeth has a length that promotes capillary dispersion of said product between two adjacent teeth.

16. The applicator nozzle of claim 15, wherein the channel opens on an exterior of the at least one intermediate tooth via two outlet apertures facing in opposite directions.

17. The applicator nozzle of claim 15, wherein the first and second end teeth are solid.

18. The applicator nozzle of claim 15, wherein the at least one outlet aperture is disposed proximate the free extremity of the intermediate tooth.

19. The applicator nozzle of claim 18, wherein the at least one outlet aperture is spaced from the free extremity of the intermediate tooth.

20. The applicator nozzle of claim 15, wherein the attachment portion comprises screw threading configured to engage with corresponding screw threading associated with the receptacle.

21. The applicator nozzle of claim 20, wherein the screw threading of the attachment portion is configured to engage with screw threading on a neck portion of the receptacle.

22. The applicator nozzle of claim 15, wherein the arrangement is configured so as to present an obstacle to product flowing substantially on respective sides of the first and second end teeth facing away from adjacent teeth.

23. The applicator nozzle of claim 15, wherein the groove is substantially elongate.

24. An applicator assembly, comprising: a receptacle configured to contain a product; and
the applicator nozzle of claim 15 attached to the receptacle.

25. The applicator assembly of claim 24, further comprising a product contained in the receptacle.

26. The applicator assembly of claim 25, wherein the product is a cosmetic product.

27. The applicator assembly of claim 25, wherein the product is a product intended for application to hair on an individual's head.

28. The applicator assembly of claim 24, wherein the receptacle comprises a tube.

29. The applicator assembly of claim 28, wherein the tube is deformable.

30. An applicator nozzle comprising:
   an attachment portion configured to attach the nozzle to a receptacle configured to contain a product; and
   an arrangement of at least four five teeth disposed in a single row comprising first and second end teeth, and
   at least three intermediate teeth positioned directly next to one another in the row, the at least three intermediate teeth being between the first and second end teeth, each the at least three intermediate teeth defining a channel extending lengthwise along each of the intermediate teeth and being configured to be placed in flow communication with product contained in the receptacle, the channel opening laterally on an exterior of each of the intermediate teeth via at least one outlet aperture facing in the direction of an adjacent tooth,
   wherein each of the intermediate teeth define at least one groove, wherein the at least one outlet aperture opens into the groove at a first end of the groove,
   wherein the groove extends lengthwise relative to each of the intermediate teeth from the first end of the groove to a second end of the groove at a free extremity of the intermediate tooth,
   wherein the arrangement is formed by a single molded piece,
   wherein the arrangement is configured so as to present an obstacle to flow of product from the outlet aperture, in the direction of the outlet aperture, beyond the first and second end teeth,
   wherein the first and second end teeth are devoid of any outlet aperture,
   wherein the first and second end teeth are the only teeth in the row devoid of any outlet aperture,
   wherein each of the at least three intermediate teeth of the row defines an aperture facing in the same direction,
   wherein the nozzle does not have any row of teeth other than the single row of teeth formed by the arrangement of at least five teeth,
   wherein the nozzle is configured to apply product to hair on an individual's head, and
   wherein the at least five teeth of the arrangement include teeth tip free ends that are in a substantially linear alignment, and
   wherein the outlet apertures of each of the at least three intermediate teeth are in a substantially linear arrangement, and
   wherein the groove of each of the intermediate teeth has a length that promotes capillary dispersion of said product between two adjacent teeth.

31. The applicator nozzle of claim 30, wherein the channel of each of the intermediate teeth opens on the exterior of-the at least one intermediate tooth via two outlet apertures facing in opposite directions.

32. The applicator nozzle of claim 30, wherein the first and second end teeth are solid.

33. The applicator nozzle of claim 30, wherein the attachment portion comprises screw threading configured to engage with corresponding screw threading associated with the receptacle.

34. The applicator nozzle of claim 33, wherein the screw threading of the attachment portion is configured to engage with screw threading on a neck portion of the receptacle.

35. The applicator nozzle of claim 30, wherein the arrangement is configured so as to present an obstacle to product flowing substantially on respective sides of the end teeth facing away from adjacent teeth.

36. The applicator nozzle of claim 30, wherein the groove is substantially elongate.

37. An applicator assembly, comprising: a receptacle configured to contain a product; and
   the applicator nozzle of claim 30 attached to the receptacle.

38. The applicator assembly of claim 37, further comprising a product contained in the receptacle.

39. The applicator assembly of claim 38, wherein the product is a cosmetic product.

40. The applicator assembly of claim 37, wherein the product is a product intended for application to hair on an individual's head.

41. The applicator assembly of claim 37, wherein the receptacle comprises a tube.

42. The applicator assembly of claim 41, wherein the tube is deformable.

* * * * *